No. 750,857. PATENTED FEB. 2, 1904.
E. E. HOXIE.
HOE.
APPLICATION FILED OCT. 17, 1903.
NO MODEL.

Witnesses
Inventor
E. E. Hoxie
By
Attorneys

No. 750,857. Patented February 2, 1904.

UNITED STATES PATENT OFFICE.

ELMER E. HOXIE, OF EDMESTON, NEW YORK.

HOE.

SPECIFICATION forming part of Letters Patent No. 750,857, dated February 2, 1904.

Application filed October 17, 1903. Serial No. 177,485. (No model.)

*To all whom it may concern:*

Be it known that I, ELMER E. HOXIE, a citizen of the United States, residing at Edmeston, in the county of Otsego, State of New York, have invented certain new and useful Improvements in Hoes; and I do hereby declare the following to be a full, clear, and exact description of the invention, such as will enable others skilled in the art to which it appertains to make and use the same.

This invention relates to hoes; and it has for its object to provide a hoe which may be employed for the usual purposes of the common flat-bladed hoe with the straight cutting edge, but which in addition thereto will be useful for lifting and carrying a quantity of earth.

A further and prime object of the invention is to provide a hoe wherein the cutting portion of the blade will be given a degree of stiffness not obtainable in the ordinary flat blade, while the advantages and uses of the flat blade will be retained.

Other objects and advantages of the invention will be understood from the following description.

Figure 1:
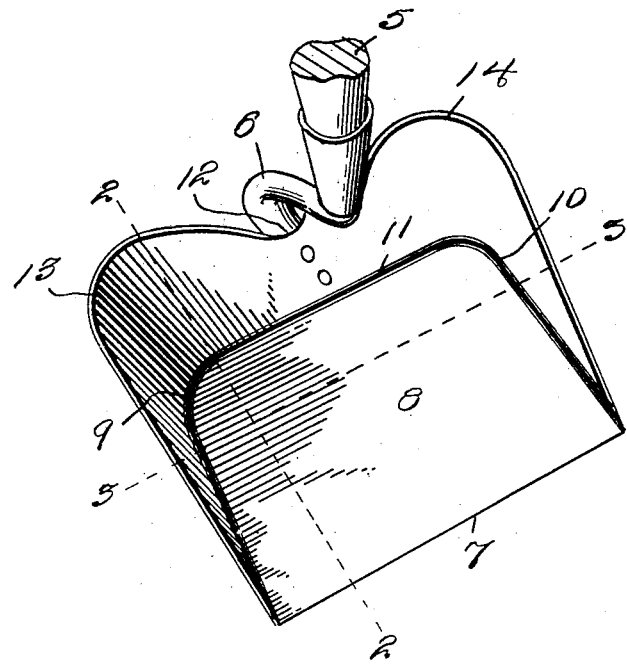
Figure 2:
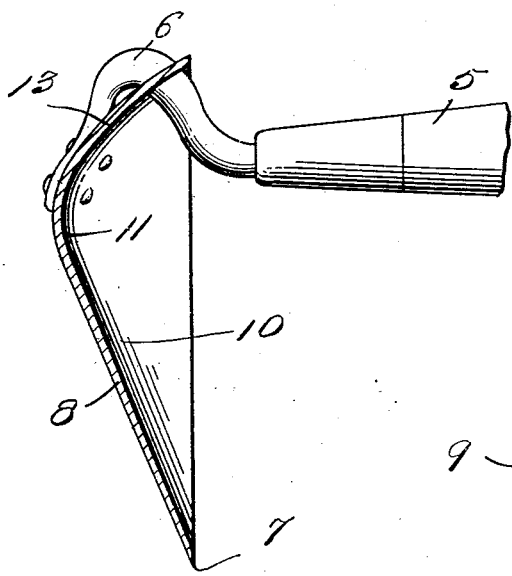
Figure 3:
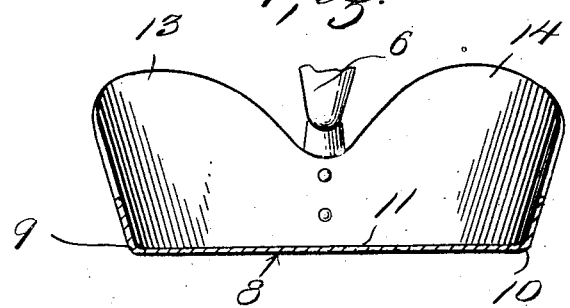

In the drawings forming a portion of this specification, and in which like numerals of reference indicate similar parts in the several views, Figure 1 is a perspective view showing a hoe embodying the present invention. Fig. 2 is a section on line 2 2 of Fig. 1. Fig. 3 is a section on line 3 3 of Fig. 1.

Referring now to the drawings, the present hoe comprises a blade and a handle, the handle being shown at 5 and being connected to the blade by the usual gooseneck or shank 6, which extends from the upper edge of the blade of the hoe. The lower edge 7 of the hoe is straight and is the cutting edge of the hoe and extends throughout the width of the blade. The blade of the hoe comprises what may be termed the "body portion" 8, which is flat and extends from the lower edge 7 of the blade upwardly for approximately two-thirds of the length of the blade, the side edges 9 and 10 of this flat body portion being converged and rounding at their upper ends to the upper straight edge 11 of the body portion, which edge is parallel with the edge 7. The flat body portion of the blade of the hoe is thus substantially in the shape of a truncated triangle, the base of which forms the entire cutting edge of the blade. All of the metal of the blade outside of the inclosure of the edges of the body portion 8 is bent curvingly in one direction, so that there is formed a raised edge or flange around three sides of the body portion 8, there being no surrounding edge at the lower corners of the blade and the edge increasing gradually in height in the direction of the top of the hoe-blade. The edge of the flange of the hoe is scalloped, so as to form the central notch 12, with the semicircular lobes 13 and 14 at the sides thereof, and it is through the notch that the shank 6 projects. With this form of blade it will be seen that the cutting portion will be greatly stiffened, so that the blade will withstand the strains incident to its use after the manner of the ordinary hoe-blade, that the raised side edges will not interfere with the use of the hoe as a pick when it is attempted to dig with the corner of the blade, and, finally, that when scraping the dirt instead of passing over the top of the hoe and falling into the furrow made by the hoe will pass laterally beyond the sides of the furrow by reason of the fact that the upper portions of the lobes 13 and 14 project beyond the flat body portion 8 to a greater extent than the portions at the sides of said flat body portion.

What is claimed is—

A hoe comprising a blade and a handle, the blade having a straight continuous lower cutting edge and a flat truncated triangular body portion extending upwardly into the blade from said lower edge and the material of the blade being curved from the top and side edges of the flat portion in the direction of projection of the handle to form a flange, the projection of the metal at the sides of the flat portion increasing gradually from zero at the lower edge of the blade to maximum at the upper edge thereof, the edge of the flange being notched midway of the upper portion thereof and having a forwardly-extending lobe at each side of the notch, for the reception of the shank of the handle therebetween.

In testimony whereof I affix my signature in presence of two witnesses.

ELMER E. HOXIE.

Witnesses:
SCOTT E. LITTLEWOOD,
CLAYTON JACOBS.